United States Patent [19]
Margerum et al.

[11] Patent Number: 5,729,242
[45] Date of Patent: Mar. 17, 1998

[54] DUAL PDLC-PROJECTION HEAD-UP DISPLAY

[75] Inventors: J. David Margerum, Woodland Hills, Calif.; John H. Erdmann, Phoenix, Ariz.; Khoon-Cheng Lim, Los Angeles, Calif.

[73] Assignee: Hughes Electronics, Los Angeles, Calif.

[21] Appl. No.: 646,576

[22] Filed: May 8, 1996

[51] Int. Cl.$^6$ .............................. G09G 5/00; G03H 1/00
[52] U.S. Cl. .......................... 345/7; 349/5; 349/11; 359/13
[58] Field of Search .................... 345/7, 9, 8; 348/51, 348/53, 54, 58, 59, 750, 751, 752, 756, 758, 761; 349/5–7, 10, 11, 16, 127, 57; 359/13, 14

[56] References Cited

U.S. PATENT DOCUMENTS

| | | |
|---|---|---|
| 4,435,047 | 3/1984 | Fergason . |
| 4,688,900 | 8/1987 | Doane et al. . |
| 4,728,547 | 3/1988 | Vaz et al. . |
| 4,859,031 | 8/1989 | Berman et al. ............... 350/174 |
| 4,938,568 | 7/1990 | Margerum et al. . |
| 4,944,476 | 7/1990 | Lackner et al. . |
| 5,099,343 | 3/1992 | Margerum et al. ............ 359/48 |
| 5,181,013 | 1/1993 | Bagshaw et al. ............ 340/702 |
| 5,200,844 | 4/1993 | Suvada ....................... 359/40 |
| 5,260,815 | 11/1993 | Takizawa ..................... 359/41 |
| 5,270,843 | 12/1993 | Wang . |
| 5,436,763 | 7/1995 | Chen et al. ................... 345/7 |
| 5,475,515 | 12/1995 | Yoshinaga et al. ............ 359/52 |
| 5,497,170 | 3/1996 | Kato et al. ................... 345/9 |
| 5,504,622 | 4/1996 | Oikawa et al. ............... 345/7 |
| 5,506,595 | 4/1996 | Fukano et al. ............... 345/7 |

OTHER PUBLICATIONS

K. Horikiri et al., "A Head–up Display for Automotive Use", *Proceedings of the SID*, 28, pp. 287–290 (1987);.

T.C. Goesch, "Head–up Displays Hit the Road", *Information Display*, 7&8, pp. 10–13 (1990);.

J.D. Margerum, et al, "Addressing Factors For Polymer Dispersed Liquid Crystal Displays", *SPIE Proc.*, 1455, 27–38 (1991).

(List continued on next page.)

*Primary Examiner*—Steven Saras
*Assistant Examiner*—David L. Lewis
*Attorney, Agent, or Firm*—V. D. Duraiswamy; W. K. Denson-Low

[57] ABSTRACT

An optical system is provided that produces bright, high contrast head-up display images which are not adversely affected by the direct exposure to sunlight of the system's virtual image source. The optical system comprises a light source system which projects a focused light beam to a segmented, electronically-addressed polymer-dispersed liquid crystal ("PDLC")-type film, which serves as a primary image source. Selected segments of the image source are made transmissive while other selected segments scatter light. Accordingly, the portions of the focused light beam incident to transmissive segments are transmitted to form a real image, while the balance of the focused light beam is scattered. A stray light-blocking means, such as a lens/aperture combination, is employed to block the scattered light. The real image is projected onto an unsegmented, electronically-addressed PDLC-type film serving as an image screen. The image screen is the head-up display image source and replaces other emissive light sources in conventional head-up displays. The PDLC-type image screen is unsegmented so that there are no display elements to provide false information upon exposure to sunlight. Moreover, the image screen is highly forward scattering, so that stray sunlight incident to the image screen is forward scattered in the direction opposite to the image source, thereby preventing the reflection of sunlight into viewers' eyes. The light transmitted through the PDLC-type image screen comprises the head-up display image, which is then projected by a projection means, such as a concave mirror or lens, to the desired location for viewing as a virtual image.

20 Claims, 1 Drawing Sheet

OTHER PUBLICATIONS

J.D. Margerum et al, *Liquid Crystals*, 14, pp. 345–350 (1993);.

M. Pfeiffer et al, *1994 International Symposium of the SID*, pp. 837–840;.

D.E. Flechsig, et al, "Edge–emitter TFEL Head–uP Display for Automotive Use", *SID 95 Applications Digest*, pp. 73–74 (1995);

J. Eschler, et al, "Liquid Crystal Light Valves for Schlieren Optical Projection", *Displays*, 16, 35–38 (1995); and.

W. Glenn et al, "Efficient Liquid–Crystal Light Valves", *SPIE Proc.* 2407, 198–213 (1995).

DUAL PDLC-PROJECTION HEAD-UP DISPLAY

BACKGROUND OF THE INVENTION

1. Field of the Invention

The present invention generally relates to the art of optically projecting head-up display images, and, more particularly, to the use of an optical system employing two polymer-dispersed liquid (PDLC)-type crystal films to project head-up display images.

2. Description of the Related Art

The automotive industry offers a so-called "head-up display" feature for inclusion in selected automobiles. Typically, a head-up display projection system provides the driver with a virtual image that presents information relevant to the operation or location of the car, such as relayed by automotive electronic systems. In general, the virtual image is focused approximately 2 meters from the head of the driver over the front bumper of the car.

A commercial head-up projection display uses vacuum fluorescent displays ("VFDs") as the image source in the system (see, e.g., T. C. Goesch "Head-up Displays Hit the Road", *Information Display*, 7&8/1990, pp. 10–13). Several other image sources have been proposed, including twisted nematic liquid crystal displays ("TN-LCDs") (see, e.g., K. Horikiri et al, "A Head-up Display for Automotive Use", *Proceedings of the SID*, 28, 1987, pp. 287–290); thin film electroluminescent ("TFEL") displays (see, e.g., D. E. Flechsig, et al, "Edge-emitter TFEL Head-up Display for Automotive Use", *SID 95 Applications Digest*, 1995, pp. 73–74); and light-emitting diode ("LED") displays. While head-up displays for airplane pilots commonly use reflection from an optical combiner, those for automobiles usually use reflection from the windshield for the virtual image seen by the driver. In these automotive displays, the low reflection efficiency of the windshield acts as an optical combiner, and the presence of high intensity ambient light causes the driver to observe a relatively low brightness and low contrast image. The presence of sunlight around the virtual image makes it appear faded and "washes out" the information. Brighter virtual images are needed on the windshield to ameliorate this problem. Another problem is that at certain angles sunlight can enter the head-up display optical system and reflect off the image elements of a light-emitting source, such as in VFDs, and back onto the windshield, whether or not these image elements are turned on. This can cause false information to be viewed by the driver, or can make it difficult to recognize the real information.

Thus, a need remains for an optical system that can produce bright, high contrast head-up display images containing reliable information given the presence of high-intensity ambient light both external and internal to the system. The new system needs to be readily manufactured inexpensively and easily incorporated into automobile designs.

SUMMARY OF THE INVENTION

In accordance with the present invention, an optical system is provided that produces bright, high contrast head-up display images which are not degraded by sunlight striking the system's image source and which are more easily seen as virtual images in the presence of bright ambient light. Moreover, a method of producing such head-up display images is provided. The present invention combines the use of two electronically-variable polymer dispersed liquid crystal ("PDLC")-type films, one as a variable primary image source with gray scale and the other as a variable diffusing screen as the head-up image source. In their light-scattering state, these PDLC-type films each scatter the incident light primarily in the forward direction (i.e., around the general direction of the incident light). In their clear state, these films do not cause appreciable scattering of the incident light. More specifically, the optical system of the present invention comprises:

(a) a light source system capable of emitting a bright, focusable light beam;

(b) an image source comprising electronically addressable segments, or picture elements (pixels) for a PDLC-type film upon which the focused light beam is projected, the image source transmitting a portion of the focused light beam and scattering the balance of the focused light beam, thereby partitioning the focused light beam into transmitted light and scattered light, the transmitted light comprising a real image;

(c) a light blocking means which is capable of blocking the scattered light and transmitting the real image;

(d) an image screen comprising an unsegmented, or uniform, PDLC-type film onto which the transmitted real image is projected, the projected image in turn for another real image; and (e) a projection means to project the real image as a virtual image.

The PDLC-type image source is selected from various kinds of liquid crystal/polymer composite films which can be electronically switched between light-scattering and transmission states by substrate transparent electrodes (e.g., ITO) which are addressed by multiplexing or active matrix transistor elements. Types of PDLC films suitably employed include, for example: off-state scattering films such as normal mode PDLCs; normal mode polymer stabilized cholesteric structures ("PSCT"); nematic curvilinear aligned phase ("NCAP"); and off-state transparent films such as reverse mode PSCTs. Intermediate voltages can be applied to these PDLC-type films to attain gray-scale images which are less scattering than their fully scattering states.

Light transmitted by the PDLC-type image source is transmitted by an aperture stray light-blocking system and projected as a real image onto a PDLC image screen, such as by a projection lens. The PDLC-type image screen is selected from various kinds of liquid crystal/polymer composite films in which the degree of light scattering of the whole screen can be electronically adjusted. This is used to fine tune the brightness of the head-up display real image that is projected onto the windshield as a virtual image by the virtual image projection means.

Light scattered by the PDLC-type image source is removed from the optical system by a light blocking system. The light blocking system comprises an aperture placed at the image position of the lamp and at least one converging lens to project the real image. Alternatively, more complex Schlieren-type optics can also be selected for the light blocking system (see, e.g., J. Eschler, et al, "Liquid Crystal Light Valves for Schlieren Optical Projection", *Displays*, 16, 35–38 (1995)).

Thus, in the practice of the present invention with normal-mode PDLC films, mildly collimated, or focused light from the light source passes through activated segments of the PDLC image source, while light incident to inactivated segments of the image source is scattered and removed by the light blocking system. The light transmitted through the PDLC image source is projected onto the PDLC image screen, which serves as the head-up display image source. The projection means, in the form of a mirror or lens, transfers the image provided by the PDLC image screen to the desired location for viewing as a virtual image, typically the windshield in the case of an automobile.

In addition to the above transmissive type PDLC image source, an alternative reflective PDLC image source can also be used. A PDLC film with electronically addressable segments is placed in front of a reflecting mirror. The PDLC film, in its normal state, scatters an incoming light beam both forwardly and backwardly strongly, and the mirror has little effect on the light. When a segment is being addressed, it transmits the light beam through the addressed segment, and the light beam is then reflected back, through the segment again, by the mirror. The reflected light beam through the addressed segment forms the image source (a real image in the pattern of the addressed segments) for the projection lens. The rest of the optical system is similar to the above transmissive type. This system has the added advantage of folding the light path to achieve a more compact optical system.

The present system offers several advantages over VFD- and LED-based head-up display systems. First and foremost, the combination of a PDLC-type image source and a PDLC-type image screen yields a head-up display system with no appreciable adverse effects from the incidence of sunlight to the head-up display source. This is accomplished by providing a PDLC-type image screen that is unsegmented so that there are no display elements to provide false information upon exposure to sunlight. Further, since the PDLC-type image screen is highly forward-scattering, any incident sunlight is forward scattered in the direction opposite to that of the head-up display image, thereby preventing the reflection of intense stray light back into the viewer's eyes. Finally, the head-up display virtual image achieved in the practice of the invention is bright and viewable, even in the presence of highly intense sunlight.

Importantly, the present optical system may be readily assembled, since its components are conventional and commercially available. Also, the simplicity of its design allows for easy modification to a particular vehicle design.

These and other features and advantages of the present invention will be apparent to those skilled in the art from the following detailed description, taken together with the accompanying drawings, in which like reference numerals refer to like parts.

DETAILED DESCRIPTION OF THE INVENTION

The optical system of the present invention combines PDLC-type image source with a PDLC-type screen that is highly forward scattering to produce bright, high contrast head-up display images which are not badly affected by the direct exposure to sunlight of either the head-up display virtual image or the PDLC-type screen.

Figure 1:
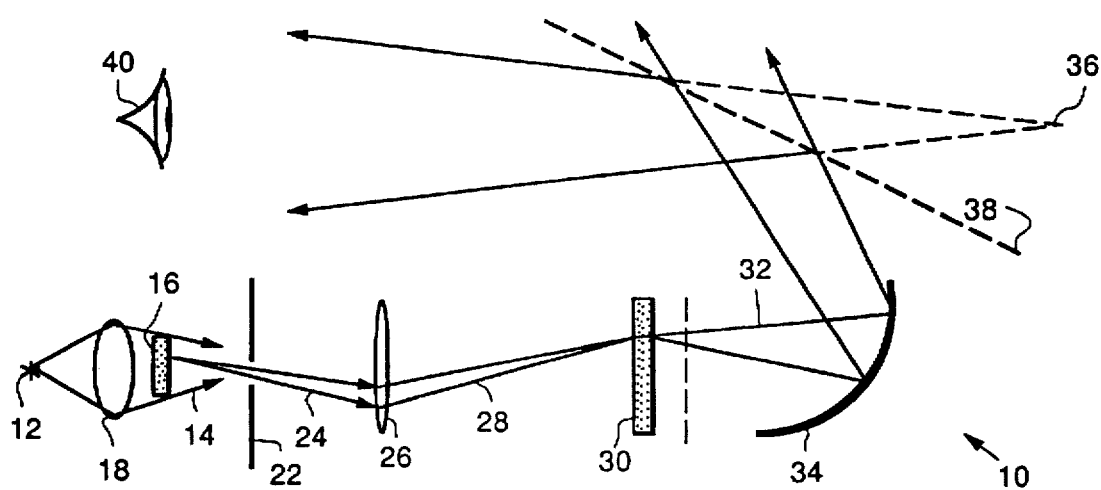
FIG. 1 is a schematic drawing illustrating the components of an optical system used to produce head-up display images in accordance with this invention.

FIG. 1 illustrates one embodiment of the optical system 10 of the present invention. In general, light from light source 12 is focused by the lens 18 to form the focused beam 14, which is focused at the stray light blocking aperture 22. A PDLC image source 16 is placed between the lens 18 and the aperture 22. The image source 16 is a flat PDLC panel that comprises of electronically addressable segments or picture elements (pixels), which when addressed act as a real image source. Beam 24, which passes through the stray light blocking aperture 22, is then projected by lens 26 as beam 28, which contains the real image, onto a second PDLC film flat panel image screen 30 which is uniformly electronically addressable over the whole panel to change its forward transmission intensities. The forward scattered light from the real image forms on the image screen 30, from where it is then projected as beam 32 by the concave mirror 34 to form a virtual image. The projected light from the mirror 34 is partially reflected by glass plate 38 (which is actually the automobile windshield) into the view line of the driver 40, and a virtual image 36 is formed in front of the driver, along the view line and superimposed on the outside view.

Figure 2:
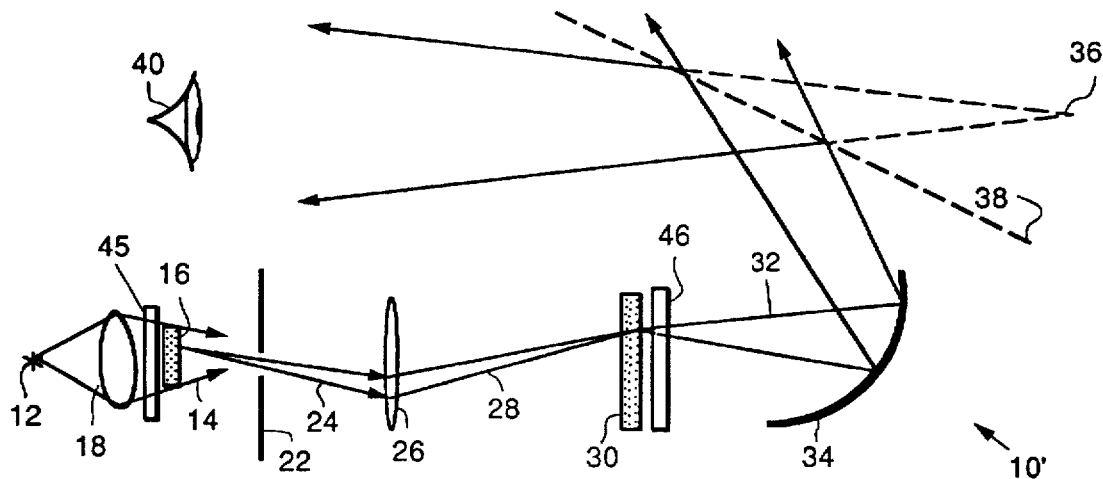
FIGS. 2 and 3 are schematic drawings illustrating alternative embodiments of the present optical system. For all three figures, the optics are shown "in-line" for better comprehension, but the optical system would likely be folded for installation so that space requirements are minimized.

FIG. 2, a slight variation of FIG. 1, which illustrates another embodiment of the optical system 10', uses a combination of (a) a holographic beam shaper 46 to concentrate more light onto the projection concave mirror 34 and thus improves the light collection efficiency of the mirror and (b) a light diffuser 45 to homogenize the light.

Figure 3:
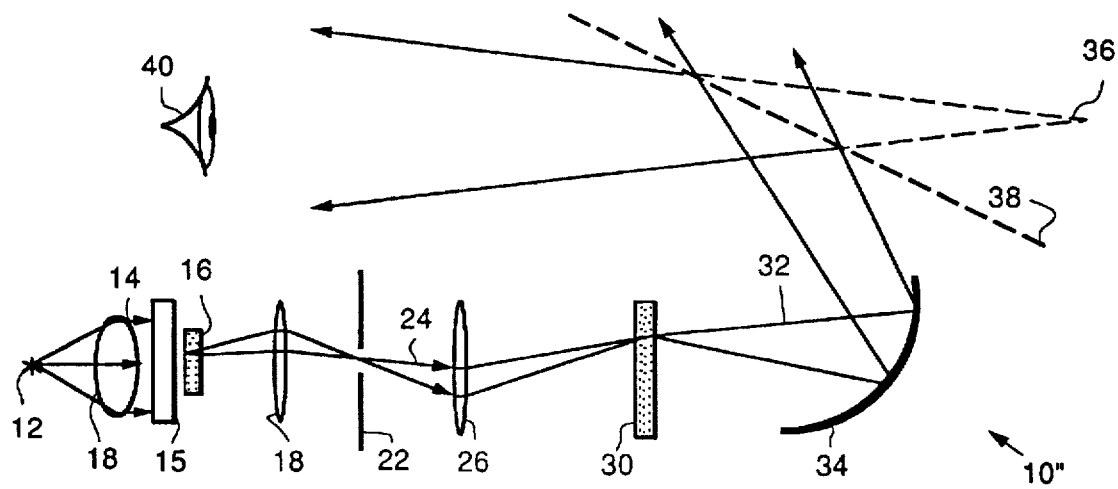

FIG. 3 illustrates yet another embodiment of the optical system 10". The optical system depicted in FIG. 3 incorporates a more sophisticated Schlieren light blocking system. FIG. 3 shows a modified version of Schlieren light blocking optics: an aperture is used to transmit an image when the PDLC is in its transmissive state. However, more conventional Schlieren optics, not shown here, can also be used. To further improve the image quality, a beam shaper 15, either a holographic beam shaper or a microlens array, can be use in the system, if required.

A proper combination of lenses, aperture diameter, and PDLC film characteristics rids the optical system of unwanted light and yields high contrast and high light throughput. Each of the elements of the present optical system are discussed in more detail below in seriatim, followed by a discussion of the PDLC material employed in the PDLC-type image source 16 and image screen 30.

The light source 12 may be represented by a lamp which has small filament to approximate a point light source. Examples of suitably employed light sources include: (1) 10 W to 75 W, small filament halogen lamps, such as model number L1051 commercially available from Gilway, which has its own light-collecting lens; (2) high intensity discharge lamps such as commercially available from General Electric; and (3) xenon lamps. Preferably, a halogen lamp is employed in the practice of the invention.

The condenser lens 18 collects and focuses the light energy from the lamp 12 into the converging beam 14 that passes through the activated segments of the PDLC-type image source 16 (when operated in "normal mode"). The condenser lens 18 preferably has an F-stop of about 1 to 2 and a typical focal length of about 4 cm. The light source 12 and condenser lens 18 together represent the "focused light beam source" of the optical system 10 depicted in FIG. 1. Notably, the focused light beam source may comprise a different and more complex assembly of components, such as depicted in FIG. 3.

After the converging beam 14 passes through the PDLC-type image source 16, it passes through an aperture 22 placed at the image position of the lamp. The hole size of the aperture, typically 1 cm or less, is approximately the lamp image size. The aperture transmits all the focused beam 14 and blocks off nearly all the scattered beam (not shown), thus enhancing the contrast ratio of the projected image.

The second converging lens 26 projects the PDLC-type object, which typically has a dimension of about 3 cm×6 cm, into a real image on the PDLC-type image screen 30, which like the PDLC image source 16, may be operated in the normal mode. The magnification of the real image achieved with the converging lens 26 is approximately 1:1 to 2:1. The condenser lens 26 preferably has an F-stop ranging from about 1.5 to 2.5 and a focal length of about 8 cm.

The choices regarding the converging lens 18, the diameter of the aperture 22, and the lens 26 (herein collectively termed the "light blocking means") are important toward achieving high light throughput and high contrast. The lens/aperture combination primarily serves to exclude light not deriving from the image source 16. Of equal import is the ability of the lens/aperture combination to avoid excluding or scattering light transmitted by the image source 16, and to then project such light cleanly to the image screen 30. Since such factors as the distance between the PDLC-type image source and PDLC-type image screen as well as the orientation of these two components will vary by application, the design of the lens/aperture combination must be tailored using known optical calculations supplemented by experimentation.

More specifically, the combination of lenses and aperture diameter chosen in the practice of the invention may be varied to create a trade-off between brightness and contrast. Ideally, an intense point source lamp 12, in combination with a very small hole size aperture 22 (closed to diffraction limited size, about 0.01 cm), yield a high contrast and high brightness projected image. However, due to the finite size of the lamp light source, there is a trade off between the contrast ratio and the intensity; though a large aperture hole size increases the intensity of the projected image, the contrast ration decreases, and vice versa. A more sophisticated Schlieren optical system can be used to increase both the contrast ratio and intensity, but at the cost of increasing optical complexity. The present system of projection, as in FIG. 1, has a contrast ratio CR~10 to 50. Its CR performance is comparable to the TN nematic projection system. Experimentation to determine the appropriate combination of lenses and aperture diameter for a particular application is considered to be a routine endeavor that is well within the capabilities of those having ordinary skill in the art and is not considered to be undue.

The PDLC-type image screen 30 serves as the head-up display virtual image source and replaces other emissive light sources in conventional head-up displays, such as found in VFD- and LED-based systems. Thus, the real image on the image screen 30 serves as a real object for further projection. The image screen 30 is designed to be highly forward scattering, typically transmitting a high percentage (about 80%) of the incident light as a cone of scattered light which fills the projection means 34. Stray sunlight that comes into this head-up projection system is forward scattered through the PDLC-type image screen 30 in the direction opposite to the image source, thereby preventing the reflection of sunlight into the viewer's eyes 40. Further, the PDLC-type image screen 30 is a uniform (unsegmented) screen with no display elements to provide false information upon exposure to sunlight as may occur in VFD- and LED-based head-up systems. Because no light polarizers are used in this dual PDLC-type optical system, the light intensity passing through the image screen 30 is much brighter (by a factor of 2 or more) than an image source from a typical TN-LCD using the same light source.

The projection means 34 projects a virtual image onto the windshield 38, which functions as an optical combiner that reflects the virtual image 36 into the sight line of the driver 40. Thus, the primary purpose of the projection means 34 is to reflect light 32 emanating from the PDLC-type image screen 30 to form virtual image 36 at the appropriate position for viewing. The driver 40 perceives the projected virtual image 36 as if it were cast out through the windshield 38 at a distance determined by the optical path length of the projection system, which may range from about 2 m to 10 m. Thus, the virtual image is superimposed on the scenery along the driver's sight line in front of the car and may contain such information as the numerical number of the speed of the automobile. Notably, the windshield 38 can be wedged to eliminate double-image effects from multiple reflections.

To project the virtual image for clear viewing by a driver, the projection means 34 must be chosen for the specific application of the present invention. The focal length $f$ of the projection means 34 is determined in relation to the object distance d (which is limited to approximately the available dimension inside the dashboard) and the virtual image distance i required. The object distance d is the distance between the image screen 30 and the projection means 34, while the image distance i is the total distance from the image 36 to the viewer 40. The three quantities are related by the well-known equation $1/d+1/i=1/f$. As a practical example, if one is comfortable with a virtual image distance of 5 m, and the dashboard dimension is about 0.2 meter, assuming that the object distance d (being restricted by the dimension of the dashboard) is also 0.2 m, then the above equation yields a concave mirror with focal length $f=0.19$ m. The projection means 34 typically comprises a concave mirror having an F-stop ranging from about 1 to 2 and a focal length of about 10 to 50 cm.

Notably, the above quantitative specifications and dimensions of the components are chosen so that the total beam path distance between the lamp 12 and the concave mirror 34 is about 50 cm, and the complete system is then sufficiently compact to be installed inside the dashboard.

Both the PDLC-type image source 16 and the PDLC-type image screen 30 have voltage-controlled scattering levels. Non-scattering segments or pixels of the image source 16 are used to form the primary image at full contrast, while at intermediate voltages segments or pixels of the image source 16 can be used for gray scale primary images. The voltage-controlled scattering level of the image screen 30 can be used to fine tune the intensity of virtual image 36, which is advantageous when lower light intensities are required for nighttime operation.

By definition, the PDLC-type films comprising the image source 16 and the image screen 30 of the present invention comprise liquid crystal material. In general, liquid crystals contain rod-like molecules of particular structures which exist in an oriented arrangement wherein many molecules are aligned with respect to each other. In a basic liquid crystal cell used in display devices, liquid crystals are placed between two sheets of a transparent conductor material, so that the liquid crystals are oriented in a selected manner. Upon application of an electric field, the liquid crystal molecules reorient in another manner. This reorientation is typically used to control the polarization direction or phase of polarized light passed through the cell. In such an approach, a continuous thin film of the liquid crystal is sandwiched between electrodes.

PDLC-type films represent alternative liquid crystal compositions which may be used between two sheets of conductor material. In PDLC-type films, the liquid crystal material is dispersed with a polymer to form a composite material. The PDLC-type films can have various types of morphologies, depending upon the materials used and the method of formation. Nematic curvilinear aligned phase (NCAP) films consist of liquid crystal droplets surrounded by a polymer matrix and are made by evaporation of solvent from an emulsion containing liquid crystal droplets and polymer (see, e.g., J. L. Fergason, U.S. Pat. No. 4,435,047). These are normal mode PDLC-type films which are scattering in the off state and cleared with an applied voltage. Samples of normal mode PDLC films suitably employed in the practice of the invention are commercially available from Edmund Scientific, Barrington, N.J. Normal mode PDLC films are made by polymerization-induced phase separation of liquid crystal droplets from a polymerizable solution during polymerization induced thermally or by ultraviolet exposure (see, e.g., J. W. Doane et al, U.S. Pat. No. 4,688,900 and N. A. Vaz et al, U.S. Pat. No. 4,728,547).

Reverse mode PDLCs are clear in the off-state and scattering with an applied voltage and are made by ultraviolet curing of solutions containing liquid crystals and bifunctional monomer mixtures (see, e.g., J. Wang, U.S. Pat. No. 5,270,843). Polymer stabilized cholesteric structures (PSCTs) are made by ultraviolet polymerization of small amounts of bifunctional monomers (2–10%) in the presence of liquid crystal mixtures (90–98%) consisting of nematics containing small amounts of chiral nematic additives. By varying the composition and the curing conditions, PSCT network composites have been made in both the normal-mode (off-state scattering, on-state clear) and in the reverse mode (off-state clear, on-state scattering) which are spontaneously reversible after voltages are applied (see, e.g., M. Pfeiffer et al, 1994 *International Symposium of the SID*, pp. 837–840).

In the practice of the invention, any conventionally-prepared PDLC-type film may be used which is electronically switchable between forward-scattering and clear states, and which reverts back to its initial state when voltage is removed. This includes films which have been referred to as PDLC, NCAP, gel or network PDLC, PSCT, etc. However, in the practice of this invention, the optimum PDLC-type film used is determined by a combination of factors, such as photostability to the projection light, operating and storage temperature ranges, operating voltages needed for addressing a segmented or an active matrix substrate, the transparency of the clear state, the light scattering properties of the scattering state, the response times in switching between the activated and inactivated states, and the cost of preparing the film on the electronic substrate.

For the primary image source 16, a normal mode PDLC or normal mode PSCT is preferred when using substrates with segment-addressed symbols, letters, and numbers because use of larger voltages is usually feasible with this type substrate to address highly scattering PDLC-type films. However, reverse mode PSCT has the advantages of higher light transmission in the clear state along with lower activation voltages, which makes it preferable for active matrix substrates with limited voltages. Since long-term photostability is also very important, it is preferable to use a copolymerizable initiator with films made by ultraviolet curing (see, e.g., J. D. Margerum et al, *Liquid Crystals*, 14, pp. 345–350 (1993)). The following are three non-exclusive examples of preferred PDLC-type films suitably employed for image source 16.

EXAMPLE 1

Normal-Mode PDLC with Commercial Components

Polymer dispersed liquid crystal film was prepared at room temperature from the mixture of two commercially available components (commercially available from Merck Ltd.) in the ratio of 20 wt % PN-393 monomer system to 80 wt % of TL-205 liquid crystal mixture. The isotropic liquid crystal/monomer mixture was contained between two transparent indium tin oxide-(ITO) coated glass plates, without any surface alignment layer, separated by a 50 µm thick Mylar spacer sheet. Phase separation of liquid crystal droplets initiated within the first 6 seconds of photopolymerization, with UV exposure totaling 15 minutes with 17 mW/cm$^2$ light intensity in the 300–400 nm range. Operating voltage required to obtain maximum transmission with this PDLC film is $\geq$50 V rms.

EXAMPLE 2

Normal-Mode PDLC with Copolymerizable Initiator

A 13 µm-thick PDLC film was made between transparent electrodes (indium tin oxide on glass, with one electrode containing a pattern of addressable segments) by photoexposure (60 mW/cm$^2$ in the 300–500 nm range for 3 minutes) of a photopolymerizable solution consisting of 35% of the liquid Crystal HRL-PD50, 63% of the monomer system HRL-URC, and 2% of the copolymerizable initiator ZLI-3331. HRL-PD50 is a proprietary liquid crystal mixture containing cyanobiphenyl, cyanophenylcyclohexane, and cyanoterphenyl components. HRL-URC is a proprietary monomer mixture of tri-3-mercaptopropionate (from Aldrich Chemical) and multifunctional vinylurethanes (not commercially available) mixed to give a SH/C=C ratio of 1.6. ZLI-3331 is 4 (2-acryloxyethoxy) phenyl 2-hydroxy-2-propyl ketone obtained from Merck, Ltd., and is not commercially available.

EXAMPLE 3

Reverse-Mode PSCT with Commercial Components

A reverse-mode polymer stabilized cholesteric texture (PSCT) sample was fabricated for use in active matrix projection displays using high resistivity liquid crystal mixtures developed for active-matrix addressed PDLC (AM-PDLC). The PSCT mixture was prepared from 93.1% TL-203 liquid crystal host, 1.9% S-2011 cholesteric additive, 4.7% RM-60 reactive monomer, and 0.3% BME (benzoin methyl ether) photoinitiator. The first three components are made by Merck Ltd., while BME is available through Aldrich Chemical or Polyscience. A pre-sealed test cell of 16 µm thickness (controlled by polymer spacer spheres) was prepared between ITO-coated transparent electrodes, overcoated with polyimide layers and buffed unidirectionally to provide parallel surface alignment of the liquid crystal mixture. The liquid crystal mixture was introduced into the test cell by a vacuum filling method. The PSCT sample was exposed for 11 hours at 0.06 MW/cm$^2$ light intensity in the 300–400 nm range. This PSCT cell was fully operational at 18 V rms.

For the PDLC-type screen 30, a normal-mode PDLC with high transmission of forward scattered light is preferred. This condition can best be attained by controlling the PDLC cell thickness, droplet size (see, e.g., J. D. Margerum et al, U.S. Pat. No. 4,938,568) and/or the pre-alignment of the droplets during formation (see, e.g., A. M. Lackner et al, U.S. Pat. No. 4,944,476). The following are three nonexclusive examples of preferred PDLC-type films suitably employed for the screen 30.

EXAMPLE 4

Normal-Mode PDLC with Commercial Components

A polymer-dispersed liquid crystal film was prepared at room temperature from the mixture of two commercially available Merck Ltd. components in the ratio of 20 wt % PN-393 monomer system to 80 wt % of TL-205 liquid crystal mixture. The isotropic liquid crystal/monomer mixture was contained between two transparent ITO-coated glass plates, without any surface alignment layer, separated by a 13 µm thick Mylar space sheet. Phase separation of liquid crystal droplets initiated within the first 6 seconds of photopolymerization, with UV exposure totaling 15 minutes with 17 mW/cm$^2$ light intensity in the 300 to 400 nm range. The operating voltage required to obtain maximum transmission with this PDLC film is $\geq$20 V rms.

EXAMPLE 5

Normal-Mode PDLC with Copolymerizable Initiator

A 10 µm thickness PDLC film was made between transparent electrodes (indium tin oxide on glass) with the components and conditions given in Example 2.

EXAMPLE 6

Normal-Mode PDLC with Pre-Alignment

A 13 µm thickness PDLC film was made between transparent electrodes (indium tin oxide on glass) by photo-exposure from a 200 W mercury lamp (20 mW/cm$^2$ at 365 nm for 3 minutes) of a photopolymerizable solution consisting of 50% of the liquid crystal BL024 (Merck Ltd.) and 50% of the monomer NOA-65 (Norland) while applying 5 V across the electrodes to give partial off-state pre-alignment of the liquid crystal droplets in the PDLC film.

It is important to note that the choice of materials for the PDLC-type films comprising the image source and the image screen will affect the brightness and contrast ultimately achieved in the practice of the invention, although not to the same extent that choice of light source and lens/aperture arrangement affect such qualities.

The addition of color to the projected image is an important option, especially for images with high information content. Color may be incorporated into the projected image 36 by one of several known methods. For instance, color may be added to the projected image by placing colored filters over the area (segments or pixels) of the PDLC image source 16 as desired. Alternatively, the PDLC image source 16 can be fabricated to include pleochroic dyes which are strongly absorbing in the PDLC-type scattering state and weakly absorbing in the clear state. The incorporation of color may also be achieved by use of colored filter areas in front of the image screen 30. No colored defects are created when sunlight enters the system 10 and illuminates the image screen 30 since it forward scatters sunlight onto the color filter in the opposite direction as does the projection light. Further, color filters can be strategically placed between the second projection lens 26 and the image screen 30 to produce the required color at the selected position of the image screen, hence, the different pans of the real image can take on different colors.

State-of-the-art variations may be incorporated in the optical system 10 along with the dual PDLC-type elements. For example, as illustrated in FIG. 2, a highly transmissive holographic optical element 45, such as commercially available from Physical Optics Corp. of Torrance, Calif., can be positioned between the lamp and the image source 16 to homogenize the output of a filament lamp in the focused light beam light source 12. As further illustrated in FIG. 2, a holographic beam shaper 46 may be incorporated between the PDLC-type screen 30 and the projection means 34 to obtain optimum utilization of the head-up display image source. Another alternative embodiment of the present invention employs a sheared PDLC film as the image screen 30 to form ellipsoidal-scattering beams on the projection mirror 34 to obtain optimum utilization of the head-up display image source (see, e.g., J. D. Margerum, et al, "Addressing Factors For Polymer Dispersed Liquid Crystal Displays", *SPIE Proc.*, 1455, 27–38 (1991)). Finally, FIG. 3 illustrates another alternative embodiment of the invention wherein a modified high contrast Schlieren optical-type system is employed as the light blocking system using microlens films and an aperture (note: an aperture is being used here instead of the more conventional light blocking bar) (see, e.g., W. Glenn et al, "Efficient Liquid-Crystal Light Valves", *SPIE Proc.* 2407, 198–213 (1995)).

Thus, there has been disclosed an optical system comprising a PDLC-type image source and a PDLC-type image screen for projecting bright, high contrast head-up display images while minimizing adverse affects due to sunlight as formerly experienced in the art. It will be readily apparent to those skilled in this art that various changes and modifications of an obvious nature may be made, and all such changed and modifications are considered to fall within the scope of the invention, as defined by the appended claims.

What is claimed is:

1. An optical system providing a head-up display virtual image, comprising:

(a) a light source system capable of producing a focusable light beam;

(b) an image source comprising a segmented polymer-dispersed liquid crystal (PDLC)-type fill onto which said focused light beam is projected, said image source transmitting a portion of said focused light beam and scattering the balance of said focused light beam, thereby partitioning said focused light beam into transmitted light and scattered light, said transmitted light comprising a real image;

(c) a light blocking means capable of blocking said scattered light and transmitting said real image;

(d) an image screen comprising a uniform PDLC-type fill onto which said transmitted real image is projected and through which said transmitted real image is transmitted; and (e) a projection means to project said real image as a virtual image.

2. The optical system of claim 1 wherein said light source system comprises a lamp selected from the group consisting of a small filament halogen lamp, a high intensity discharge lamp, and a xenon lamp and wherein said light source system further comprises a condenser lens to converge said focused light beam and project it to said image source.

3. The optical system of claim 2 further comprising a light diffuser upon which said condenser lens projects said focused light beam.

4. The optical system of claim 1 further comprising a holographic beam shaper to receive said real image after transmission through said image screen.

5. The optical system of claim 1 wherein said image source comprises an electronically addressable a segmented or pixeled PDLC-type film selected from the group consisting of nematic curvilinear aligned phase (NCAP) films, polymer stabilized cholesteric structures (PSCT), and polymer dispersed liquid crystal film (PDLC).

6. The optical system of claim 5 wherein said segmented PSCT and PDLC films each further comprise a copolymerizable initiator.

7. The optical system of claim 1 wherein said image screen comprises an unsegmented, forward-scattering PDLC-type film selected from the group consisting of nematic curvilinear aligned phase (NCAP) films, polymer stabilized cholesteric structures (PSCT), and polymer dispersed liquid crystal film (PDLC).

8. The optical system of claim 7 wherein said PSCT and PDLC films each further comprise a copolymerizable initiator.

9. The optical system of claim 1 wherein said light-blocking means comprises an aperture and further comprises at least one converging lens.

10. The optical system of claim 1 wherein said projection means is selected from the group consisting of a concave mirror and a lens.

11. A method for producing a head-up virtual display image, comprising:

(a) producing a focused light beam;

(b) projecting said focused light beam to an electronically-addressed image source comprising a segmented PDLC-type film;

(c) applying voltage to segments of said electronically-addressed image source, thereby partitioning said segments into transmissive segments and light-blocking segments, said transmissive segments transmitting said focused light beam incident thereto, thereby forming a real image, and said light-blocking segments scattering said focused light beam incident thereto;

(d) blocking said scattered light with a stray light-blocking means, said light-blocking means transmitting said real image and projecting said real image to an electronically-addressed image screen comprising an unsegmented, forward-scattering PDLC-type film;

(e) applying voltage to said electronically-addressed image screen, thereby activating said electronically-addressed image screen to transmit said real image to a projection means; and (f) projecting said real image transmitted by said image screen using said projection means, thereby forming a head-up display virtual image.

12. The method of claim 11 wherein said focused light beam is produced by a light source comprising a lamp selected from the group consisting of a small filament halogen lamp, a high intensity discharge lamp, and a xenon lamp and is then converged with a condenser lens to project said focused light beam to said image source.

13. The method of claim 12 further comprising diffusing said converged focused light beam with a light diffuser.

14. The method of claim 11 wherein step (e) further comprises projecting said real image to a holographic beam shaper to receive said real image after transmission through said image screen.

15. The method of claim 11 wherein said image source comprises a segmented PDLC-type film selected from the group consisting of nematic curvilinear aligned phase (NCAP) films, polymer stabilized cholesteric structures (PSCT), and polymer dispersed liquid crystal film (PDLC).

16. The method of claim 15 wherein said PSCT and PDLC films each further comprise a copolymerizable initiator.

17. The method of claim 11 wherein said image screen comprises an unsegmented, forward-scattering PDLC-type film selected from the group consisting of nematic curvilinear aligned phase (NCAP) films, polymer stabilized cholesteric structures (PSCT), and polymer dispersed liquid crystal film (PDLC).

18. The method of claim 17 wherein said PSCT and PDLC films each further comprise a copolymerizable initiator.

19. The method of claim 11 wherein said light-blocking means comprises an aperture and at least one converging lens.

20. The method of claim 11 wherein said projection means is selected from the group consisting of a concave mirror and a lens.

* * * * *